Oct. 22, 1957 E. V. RIPPINGILLE 2,810,347
FLUID PUMP

Filed Dec. 30, 1953 2 Sheets-Sheet 1

INVENTOR
Edward V. Rippingille
BY
L. D. Burch
ATTORNEY

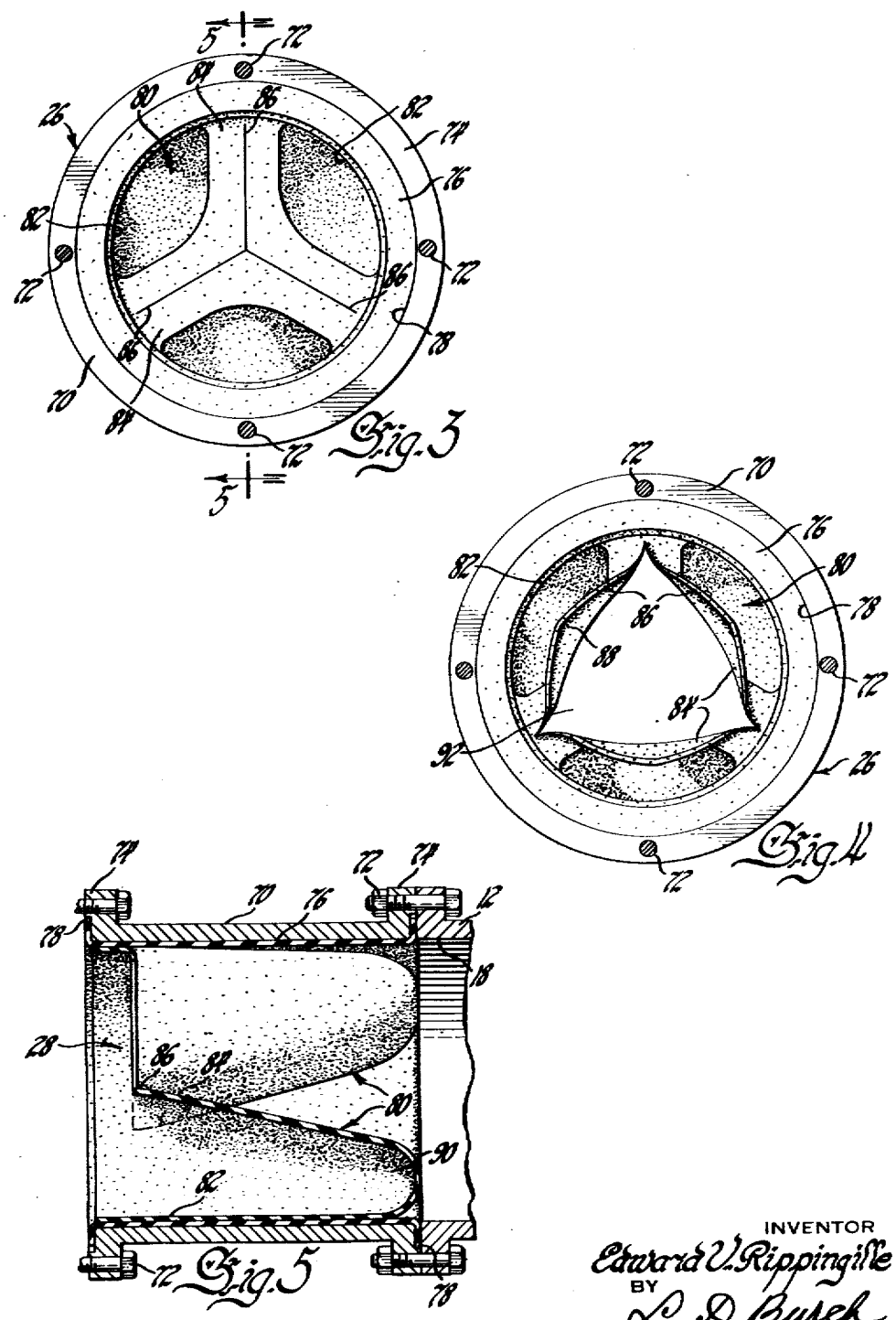

United States Patent Office 2,810,347
Patented Oct. 22, 1957

2,810,347

FLUID PUMP

Edward V. Rippingille, Farmington, Mich., assignor to General Motors Corporation, Detroit, Mich., a corporation of Delaware Application December 30, 1953, Serial No. 401,161

4 Claims. (Cl. 103—44)

This invention relates to fluid pumps generally and more particularly to fluid pumps which are capable of moving a slurrious, cellular, or other fluid mass without concern for the constituents thereof.

The conventional means for moving a slurry of sand, mortar or similar mass containing large particles of solid matter has been by the use of a centrifugal type fluid pump. Such pumps have also been used with hydraulic reprocessing and dredging equipment to reclaim solid matter from the bottom of rivers, lakes, harbors and the like. However, these pumps are considered to be inefficient in operation, limited in capacity and subject to rapid depreciation when so employed. Their continued use is primarily based on the lack of necessity for providing fluid flow check valves. All pumps employing check valves have heretofore been considered incapable of passing a slurrious mass without consequential obstruction and damage to the check valves and their seats. Even the centrifugal type slurry pump to subject to similar damage, though to a less extent, as a result of said particles impinging against and lodging within the impellers of such pumps.

Fluids of cellular structure while causing no damage to the elements comprising the pumping unit are themselves subject to damage and destruction by the excessive fluid and unit pressures created within such pumps. The impeller blades of centrifugal pumps cause damage to the cellular structure of the fluid and the check valves of other pumps normally cause unit pressures which also break down the fluid's cellular composition.

It is now proposed to provide a positive displacement fluid type pump capable of handling any fluid mass regardless of its constituents without damage to the pump or the fluid mass. Such pump comprises a flexible conduit disposed within a fluid chamber and having multi-cusped check valves disposed at opposite ends of the conduit to provide for a unidirectional flow of fluid therethrough. Alternate withdrawal and compression of fluid within the exterior chamber is adapted to cause the flexible conduit to expand and contract and to force fluid and solid matter through the pump system.

It is an object of this invention to provide a fluid type pump capable of passing a slurrious mass comprising solid particles of any given size or quantity. The uses for such a pump are many not only in hydraulic dredging but in reclamation processes, conveyor systems, and numerous other applications.

It is also an object of this invention to provide a positive displacement pump for moving a slurrious mass. Such a pump is far more efficient than those pumps presently employed and far less susceptible to the damage now prevalent in slurry pumps.

It is a further object of this invention to provide a means of moving fluids themselves without injury or damage to the cellular structure of such fluids. The chemical industry has long awaited a conveyor system for moving delicate fluids such as blood whose cellular structure is broken down and destroyed by excessive fluid and unit pressures.

It is a still further object to provide fluid flow check valve which will effectively stop the flow of fluid, will not be obstructed by large solid particles dispersed within the fluid, and which is not injured or destroyed by the continual passage of such particles therethrough. This valve may be adapted to provide any given unit pressure in seating from that sufficient to sustain a high column of slurrious matter to that which is incapable of damaging the most delicate solid or fluid substance.

It is an even further object of this invention to provide a pump for moving solids which are sparingly dispersed within a fluid with a minimum withdrawal of fluid and consequently a greater withdrawal of the solid matter. The check valves employed are adapted to yield only to the extent necessary to pass the matter adjacent the valve. Hence fluids, which flow much more readily than solids, require a smaller passageway and the valve opening is therefore normally limited, yielding only to pass the solid substance when encountered.

Another object of this invention is to provide a slurry pump which is comprised of a minimum of parts, easily assembled and disassembled for the repair or replacement of damaged elements, which is compact, durable, and inexpensive to operate and which will provide the maximum operational efficiency.

Figure 2 is taken in the plane of line 2—2 of Figure 1 viewed in the direction of the arrows thereon.

Figure 3 is a cross sectional view of the proposed pump taken in the plane of line 3—3 of Figure 1 and viewed in the direction of the arrows thereon.

Figure 4 is substantially the same as Figure 3 showing the tricuspid check valve in the open position.

Figure 5 is a cross sectional view of the valve means shown in Figure 3 taken in the plane of line 5—5 thereon.

Figure 1:
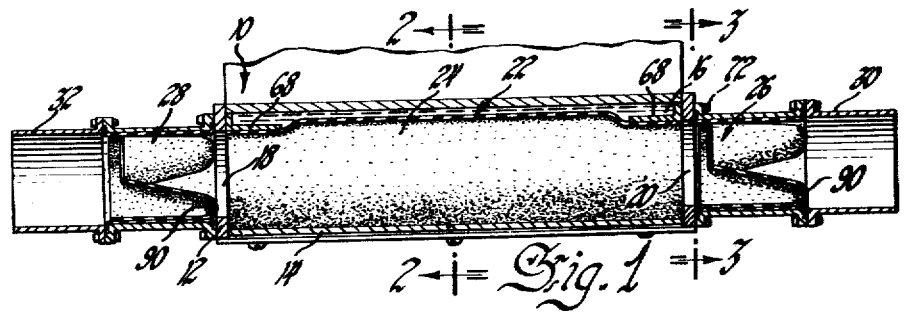
Figure 1 is a cross sectional side elevation of a part of the proposed fluid pump.
Figure 2:
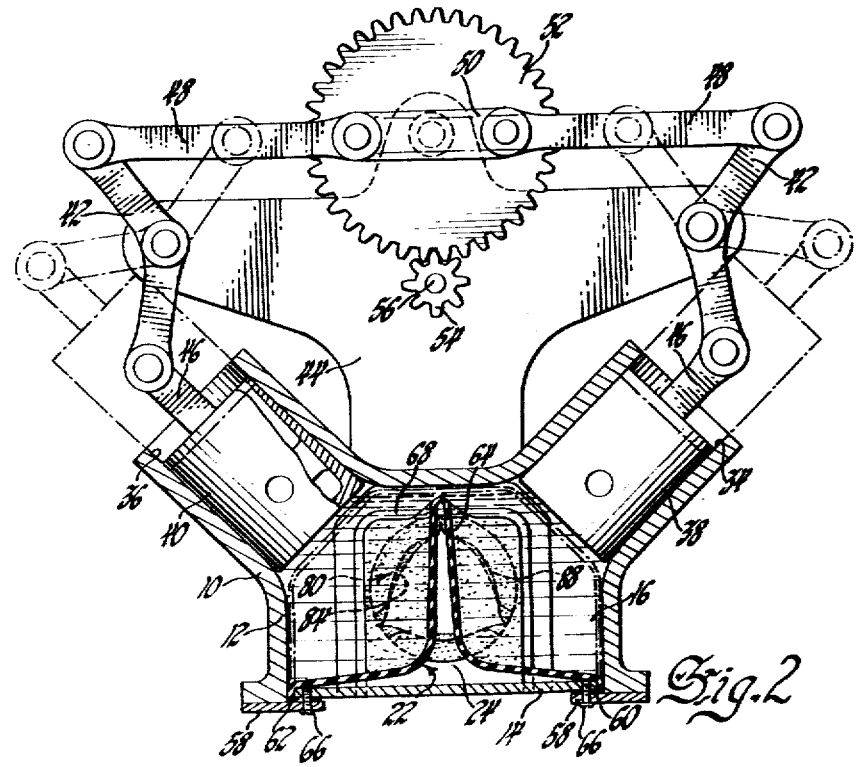
Figure 2 is a cross sectional end view of the fluid pump shown in Figure 1.

Referring to Figures 1 and 2 there is shown a positive displacement fluid pump 10 comprising a hollow casing 12 closed at both ends and having a plate 14 secured to its base to provide a fluid chamber 16 within the casing. Openings 18 and 20 are formed through opposite ends of the casing 12 and a flexible conduit 22 is secured between the openings to form a fluid flow passageway 24 through the casing separate from the fluid chamber 16. Fluid flow check valves 26 and 28 are secured to the casing 12 adjacent each opening 18 and 20 and are arranged to provide for the unidirectional flow of fluid through the flexible conduit 22. A fluid inlet conduit 30 and a fluid outlet conduit 32 are secured to the valves 26 and 28 respectively. Recessed cylindrical chambers 34 and 36 are formed on substantially opposite sides of the casing 12 and in communication with the fluid chamber 16. Close fitting pistons 38 and 40 are disposed within the cylindrical chambers 34 and 36 and are adapted to be reciprocated by means of bell cranks 42 pivotally secured to a support plate 44 mounted on the casing 12. One end of each bell crank is secured to the piston rod 46 of one of the pistons and the other end is secured to a connecting rod 48 journalled on a throw of a two-throw 180° crankshaft 50. The crankshaft 50 is secured to a driven gear 52 rotatably mounted on the support plate 44 and driven through a drive gear 54 secured to a drive shaft 56.

An inwardly extending ledge or shelf 58 is formed along each side of the base of the casing 12 and the closure plate 14 is seated thereon from within the fluid chamber 16. The flexible conduit 22 is formed by having the lateral edges 60 and 62 of a sheet of yieldable and easily deformable material, such as rubber or other suitable flexible material 64, wrapped around the sides of the closure plate 14 and retained between the closure plate and the ledge 58. The ends of the flexible material 64 are secured by bonding or other means to an inwardly extending collar 68 secured to the casing around each opening 18 and 20. Fastening means 66 are adapted to secure the plate 14 to the ledge 58 and the edges 60 and 62 of the material 64 therebetween to provide a fluid tight seal for the fluid chamber 16 and a non-deformable base 14 for the fluid passageway 24.

The fluid flow check valves 26 and 28 are secured within valve housings 70. The housings 70 are secured to each end of the casing 12 about the openings 18 and 20 and to fluid flow conduits 30 and 32 as by fastening means 72 which extend through flanges 74 formed about the ends of the housings. The valves 26 and 28 include a flexible tubular member 76 having its opposite ends received within annular recesses 78 formed in the faces of the flanges 74 and held therein by securing the flanges to the casing 12 and conduit 30 or 32. A plurality of elongated flexible walled members 80 are formed at one end of the tubular member 76 or are secured thereto by bonding or other means. In the present embodiment three such flexible walled members 80 are employed and are spaced circumferentially around the tubular member 76. The portion 82 of each flexible walled member 80, which is secured to the tubular member 76, is adapted to be of an area substantially the same or less than the area of the flexible wall 84 of such member which extends outwardly over such portion. Thus when the flexible wall 84 is collapsed against the portion 82 the surfaces of such wall and portion are substantially complementary and the flexible wall 84 need not be stretched. The leading edge or outer end 86 of the outwardly extended flexible wall 84 is adapted to engage and seat against the opposite side wall of the tubular member 76 for closing off the flow of fluid therethrough. In the present instance the opposite side wall of the tubular member 76 includes other flexible walls 84 having similar outer ends 86 which are engaged together to prevent fluid flow.

The preferred embodiment is shown as a tricuspid valve. In Figure 3 the engaging ends 86 of the outwardly extended seamless flexible walls 84 are seen to have a dimension equal to the diameter of the tubular member 76. The secured portions 82 of the flexible walled members have a dimension equal to one third of the circumference of the tubular member 76. Since $\frac{1}{3}\pi D = 1.0472D$ the width of the secured portion 82 is almost identical to the width of the outwardly extended flexible wall 84. The same ratio of widths prevails along the entire length of the flexible walled members 80. Since the outwardly extended flexible wall 84 is adapted to have a surface which is not substantially less in area than that of the surface upon which it is adapted to collapse, the flexible walled members 80 may be collapsed to the full extent of the tubular member, as seen at 88, without stretching or otherwise fatiguing the flexible walls.

From one end of the tubular member 76 the flexible walled members appear to form pockets or fluid receiving chambers 90. When the valves 26 and 28 are positioned within a conduit 30 or 32 having fluid flowing therethrough and secured in the aforementioned or similar manner, fluid pressures on one side of the valve cause the outwardly extended flexible walls 84 to fold over and form a fluid flow passage 92 through the valve. When the fluid pressure on the other side of the valve becomes greater the pockets 90 are filled expanding the flexible wall 84 and urging the edge portions 86 of adjacent members into more secure engagement.

In the operation of the positive displacement fluid pump 10 for the purpose of moving a slurrious mass comprising large particles of solid matter the inlet conduit 30 is connected to a fluid mass. The pistons 38 and 40 are simultaneously reciprocated within their respective cylindrical chambers 34 and 36. Fluid is first withdrawn from the fluid chamber 16 into the recessed chambers 34 and 36 and then is returned. The alternate admission and evacuation of fluid from the fluid chamber 16 causes the flexible conduit 22 to expand and contract in response to the pressure differential applied to the conduit walls. As the conduit 22 is expanded the pressure within passageway 24 becomes less than that within the inlet flow conduit 30. Fluid pressure is thus greatest against the outwardly extending portion 84 of each flexible walled member 80 of the inlet check valve 26 causing such portions to partially fold open as shown in Figure 4. At the same time the pressure within the outlet conduit 32 is greater than that within the fluid passageway 24 and the pockets 90 of the outlet valve 28 are filled expanding the outwardly extending flexible walls 84 of the outlet check valve 28 and holding the end portions 86 together for closing off the flow of fluid through the outlet valve.

As the pistons 38 and 40 are moved downwardly within the recessed fluid chambers 34 and 36 the walls of the fluid conduit 22 are pressed inwardly by fluid pressure. The pressure within the passageway 24 becomes greater than that within the flow conduits 30 and 32 and the pressure differential opens the outlet valve 28 and closes the inlet valve 26.

When a large particle of solid matter is encountered the flexible walls 84 are adapted to open sufficiently to pass such particle and to the full extent of the housing member 70 as shown at 88 where necessary. The solid matter is passed through the passageway 24 over the closure plate 14 and out the outlet check valve 28.

The flexible walls 84 are adapted to fold open in response to a given differential of pressure and may be adapted to open or close in response to any given fluid pressure by merely having the walls formed of a more or a less yieldable material.

A cellular fluid may be safely moved by the pump 10 by employing valves having membranous flexible walled members 80 adapted to close when the pressure differential is but slight and to seat lightly but firmly against either the adjacent flexible walled members or the side of the valve housing 70 where only one such member is employed. Fluid cells disposed on the engaging edge portions 86 of the flexible walled members need not be damaged even if caught by the closing members since the yieldable material of which the members are formed being flexible is incapable of providing a unit pressure capable of damaging the cells.

I claim:

1. A pump for moving a slurrious mass and which includes a pump housing having a chamber provided therein, a plate member closing the bottom side of said housing, a flexible walled member disposed within said housing chamber and having the side edges thereof engaged with said plate for forming a flexible walled passage therewith, flexible walled tricuspid inlet and outlet check valves closing opposite ends of said housing and of said flexible walled passage, and means for imposing a pressure within said housing externally of said flexible walled passage and opposite said plate member for collapsing said flexible walled member against said plate and moving a slurrious mass over said plate and through said outlet check valve.

2. A pump for moving slurrious cellular and other fluid masses and which includes a pump housing having a chamber provided therein, a plate member closing the bottom side of said housing chamber and having the side edges thereof engaged with the side edges of said plate member for forming a flexible walled passage therewith, flexible walled tricuspid inlet and outlet check valves closing opposite ends of said housing and of said flexible walled passage, and means for imposing a pressure within said housing externally of said flexible walled passage and on opposite sides thereof for collapsing said flexible walled member together and toward said plate and forcing any slurrious mass within said passage over said plate and through said outlet check valve.

3. A pump for moving a slurrious mass and which includes a pump housing having a chamber formed therein and a plate member closing the bottom side of said chamber, a flexible walled member disposed within said housing chamber and extending the length thereof, said flexible walled member having the side edges thereof engaged with said plate for forming a flexible walled passage therewith, means for alternately imposing negative and positive pressures within said housing chamber externally of said flexible walled passage, said flexible walled passage being expanded by a negative pressure imposed within said housing chamber and being collapsed by a positive pressure imposed therein without stretching, and flexible walled tricuspid inlet and outlet check valves disposed within opposite ends of said housing and said flexible walled passage for closing said passage and alternately opening and closing to pass said slurrious mass through said passage.

4. A pump for moving a cellular fluid mass and the like without damage thereto and which includes a pump housing, a plate member closing the bottom side of said housing and having a flexible walled member disposed within said housing and engaged with said plate for forming a flexible walled passage therewith, flexible walled tricuspid inlet and outlet check valves closing opposite sides of said housing and opposite ends of said flexible walled passage, means for imposing positive and negative pressures within said housing and externally of said flexible walled passage, said flexible walled member being expandable to the limits of said housing walls by negative pressures imposed within said housing and being collapsible partially against said plate and partially together by positive pressures imposed within said housing without stretching, and means for controlling the imposition of negative and positive pressures within said housing for alternately expanding and contracting said flexible walled member and pumping a cellular fluid mass through said check valves and passage.

References Cited in the file of this patent

UNITED STATES PATENTS

| Re. | 682 | Peale | Apr. 5, 1859 |
| 584,091 | | Leidick | June 8, 1897 |
| 2,450,751 | | Elwood | Oct. 5, 1948 |
| 2,576,192 | | Poznik | Nov. 27, 1951 |
| 2,682,057 | | Lord | Jan. 29, 1954 |

FOREIGN PATENTS

| 7,172 | Great Britain | of 1890 |
| 719,253 | Germany | 1942 |

U. S. DEPARTMENT OF COMMERCE
PATENT OFFICE

CERTIFICATE OF CORRECTION

Patent No. 2,810,347                                   October 22, 1957

Edward V. Rippingille

It is hereby certified that error appears in the printed specification of the above numbered patent requiring correction and that the said Letters Patent should read as corrected below.

Column 1, line 34, for "said particles" read --solid particles--.

Signed and sealed this 25th day of March 1958.

(SEAL)
Attest:
KARL H. AXLINE

Attesting Officer                                               ROBERT C. WATSON
                                                                         Commissioner of Patents